May 22, 1928.

C. A. HALL 1,671,028

MOLDING MACHINE

Filed June 16, 1926   2 Sheets-Sheet 1

WITNESS:
Rob R Kitchel

INVENTOR
Clarence A. Hall
BY
Augustus B. Stoughton
ATTORNEY.

May 22, 1928.  
C. A. HALL  
MOLDING MACHINE  
Filed June 16, 1926  
1,671,028  
2 Sheets-Sheet 2

WITNESS:  
INVENTOR  
Clarence A. Hall  
BY Augustus B. Stoughton  
ATTORNEY

Patented May 22, 1928.

UNITED STATES PATENT OFFICE.

CLARENCE A. HALL, OF PHILADELPHIA, PENNSYLVANIA.

MOLDING MACHINE.

Application filed June 16, 1926. Serial No. 116,296.

The principal object of the present invention is to provide for properly filling the mold cavities of a moving series of molds with molten metal of which lead is an example.

Other objects of the invention will appear from the following description at the end of which the invention will be claimed.

In the accompanying drawings forming part hereof there is illustrated a molding machine embodying features of the invention and in those drawings Figure 1 is a top view of the machine with parts broken away.

Figure 1:
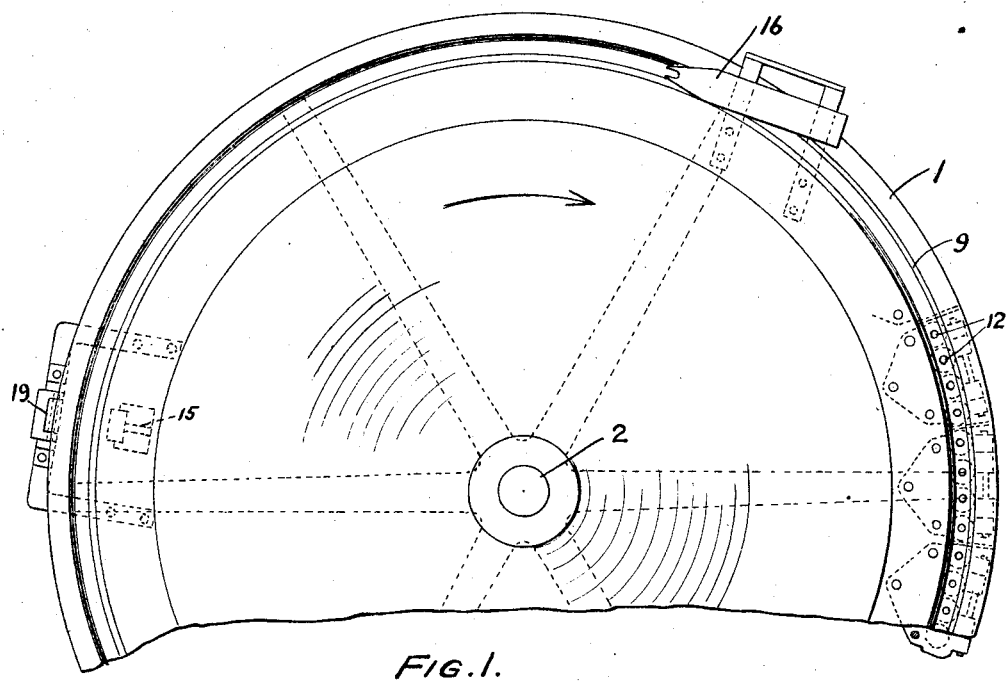

In the drawings I is a revoluble table inclined to the horizontal. As shown it is mounted upon a shaft 2 revoluble in inclined bearings 3 forming part of or provided by a fixed frame. As shown the table is revolved by gearing 5 driven from the shaft 6 which may be driven by the gearwheel 7. This table 1 is provided underneath with a series or molds generally indicated at 8, and disposed circularly, and on top with a circular ingate channel 9 communicating with the cavities of the molds.

Figure 4:
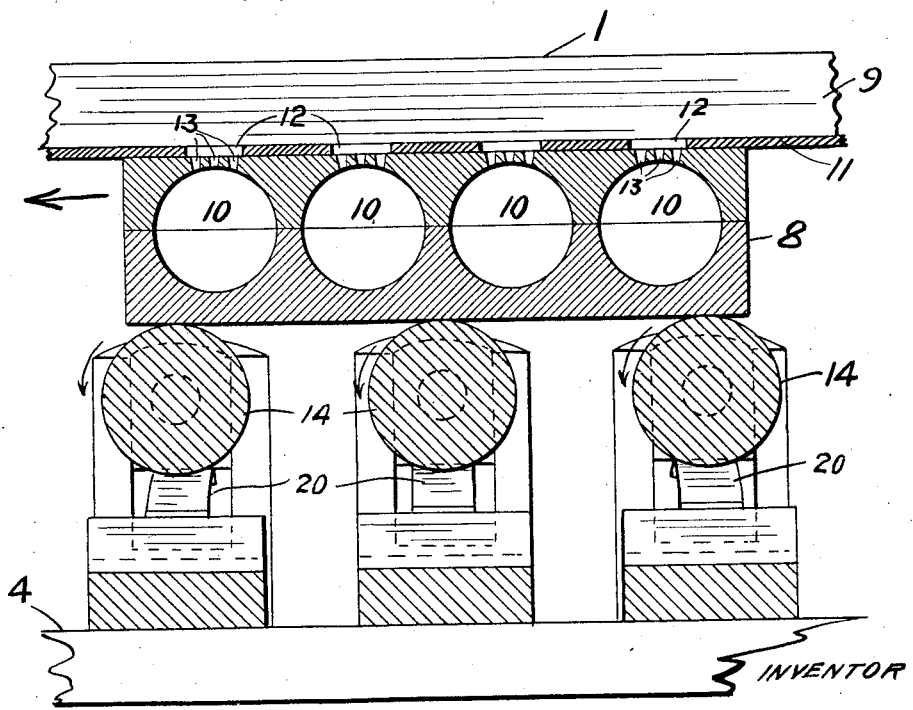
Fig. 4 is a sectional view taken on the line 4—4 of Fig. 3.

As shown each of the molds is of the two part hinged variety and is provided with more than one mold cavity, four in the present instance. Each mold cavity 10 communicates with the ingate channel 9, Fig. 4, as shown by a plurality of openings. and the bottom of the ingate channel 9 is shown to consist of a plate 11 having therein openings 12 aligned with the openings or group of openings 13 by which molten metal passes from the channel 9 to the mold cavities 10. The frame 4 is provided with a roller bed 14 which serves to close and keep closed the molds 8, the roller bed being in the form of an arc of a circle and arranged at the low portion of the table 1. At the high portion of the table 1 are devices 15 for opening the molds. 16 is a plow carried by the frame 4, and it co-operates with the channel 9 to remove solidified metal not required to fill the molds. The rolls of the roller bed 14 are shown as supported on spring bearings 20.

Figure 2:
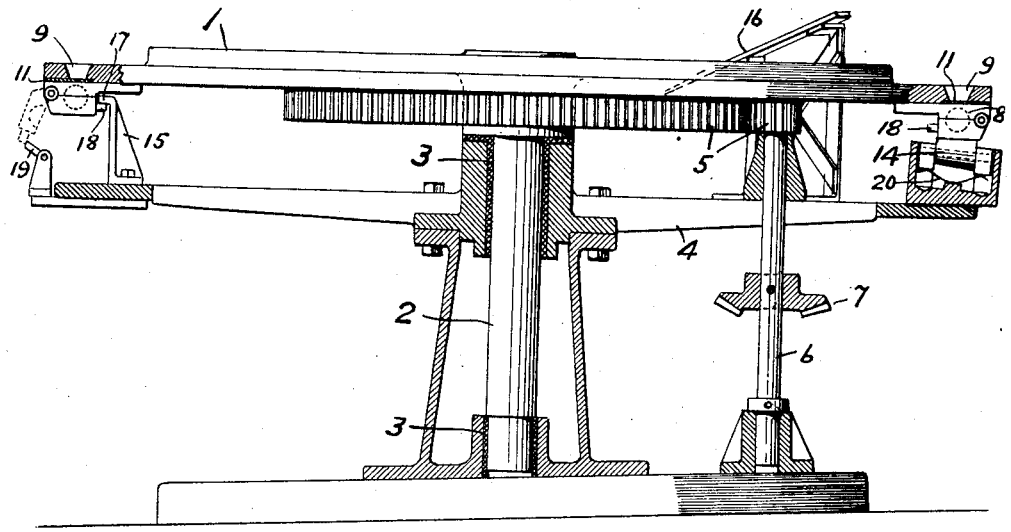
Fig. 2 is a central sectional view taken on a line between succeeding sets of molds.
Figure 3:
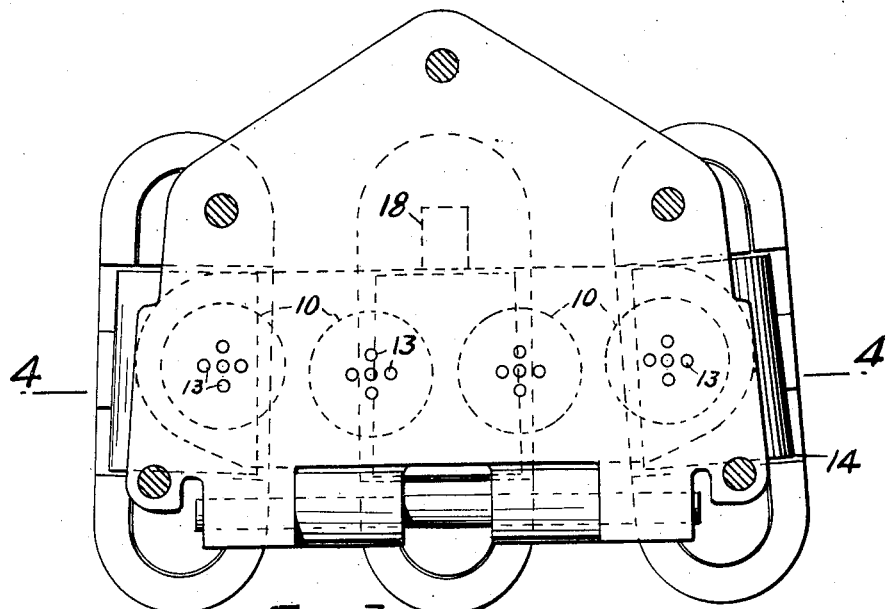
Fig. 3 is a view drawn to an enlarged scale and illustrating one set of molds detached.

Molten metal, as lead, is continuously supplied to the channel 9 of the rotating table, for example, at some point to the right of the plow 16 in Fig. 1, and as the table rotates there is formed in the channel 9 at the low part of the table what may well be described as a pool of molten lead. From this pool, molten lead enters the mold cavities and fills them while the table is in rotation. Lead not required to fill the mold cavities solidifies in the channel 9 as the table rotates, and this solidified lead, if present is removed by the plow 16. As the table rotates the rollers of the bed 14 serve to close and to keep closed the molds while they are filled with molten metal and until that metal solidifies. As the molds approach the device 15, the projection 17 or cam operating upon the followers 18 on the movable hinged sections of the molds opens the molds so that they swing down and may be held open long enough to discharge their contents by the detent 19, as indicated in dotted lines to the left in Fig. 2.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A molding machine comprising a revoluble table inclined to the horizontal and provided underneath with a series of molds and on top with a circular ingate channel communicating with the cavities of the molds whereby a pool of molten metal is provided at the low part of the channel.

2. A molding machine comprising a revoluble circular ingate channel structure inclined to the horizontal, and a series of molds arranged beneath the channel and in communication therewith.

3. A molding machine comprising a revoluble table inclined to the horizontal and provided underneath with a series of molds and on top with a circular ingate channel communicating with the cavities of the molds whereby a pool of molten metal is provided at the low part of the channel, and a plow in fixed relation to the channel and adapted to remove therefrom solidified metal in excess of that required by the molds.

4. A molding machine comprising a revoluble circular ingate channel structure inclined to the horizontal, a series of molds arranged beneath the channel and in communication therewith, and a plow in fixed relation to the channel and adapted to remove therefrom solidified metal in excess of that required by the molds.

5. A molding machine comprising a revoluble table inclined to the horizontal and provided underneath with a series of two-part hinged molds and on top with a circular ingate channel communicating with the cavities of the molds, an arcuate roller bed in fixed relation to the table and adapted for cooperation with closed molds, devices in fixed relation to the table for opening the molds to discharge them, and a plow in fixed relation to the channel.

6. A molding machine comprising a table inclined to the horizontal and having on top an ingate, a series of molds in communication with the ingate, and means for presenting the molds in series to the low part of the ingate.

CLARENCE A. HALL.